(12) United States Patent
Shorey et al.

(10) Patent No.: US 7,065,482 B2
(45) Date of Patent: Jun. 20, 2006

(54) INTERNET TRAFFIC ANALYSIS TOOL

(75) Inventors: Rajeev Shorey, New Delhi (IN); Abhinav Kamra, Noida (IN); Sundeep Kapila, Gujarat (IN); Varun Khurana, Noida (IN); Vikas Yadav, Haryana (IN)

(73) Assignee: International Business Machines Corporation, Armonk, NY (US)

( * ) Notice: Subject to any disclaimer, the term of this patent is extended or adjusted under 35 U.S.C. 154(b) by 833 days.

(21) Appl. No.: 09/860,114

(22) Filed: May 17, 2001

(65) Prior Publication Data

US 2002/0174216 A1    Nov. 21, 2002

(51) Int. Cl.
*G06F 15/173*    (2006.01)

(52) U.S. Cl. .................. 703/224; 709/223; 709/232; 703/2

(58) Field of Classification Search ........... 709/223, 709/224, 232; 703/2
See application file for complete search history.

(56) References Cited

U.S. PATENT DOCUMENTS

| 6,078,953 | A  | * | 6/2000  | Vaid et al. ............... 709/223 |
| 6,578,077 | B1 | * | 6/2003  | Rakoshitz et al. ......... 709/224 |
| 6,757,255 | B1 | * | 6/2004  | Aoki et al. ............... 370/252 |
| 2001/0050901 | A1 | * | 12/2001 | Love et al. ............. 370/235 |

OTHER PUBLICATIONS

Oppenheimer, Priscilla. "Top-Down Network Design." Aug., 1999. Cisco Press, 1st Edition, Chapter 2.*
Heyman et al. "A New Method for Analyzing Feedback-Based Protocols with Applications to Engineering Web Traffic over the Internet." 1997. Proceedings of the 1997 ACM SIGMETRICS International Conference on Measurement and Modeling, pp. 24-38.*
Wang et al. "Improving TCP Performance over Asymmetric Networks." Jul., 2000. ACM SIGCOMM Computer Communications Review, pp. 45-54.*
"Internet Statistics and Metrics Analysis: Passive Measurement Data and Analysis", Workshop report, Jan. 14-15, 1999, San Diego, http://www.caida.org/outreach/papers/isma9901/report.html, 12 pages.
Allen B. Downey, "Using pathchar to estimate Internet link characteristics", http://www.cs.colby.edu/~downey/pathchar. In Proceedings of ACM SIGMETRICS'99, Atlanta, Georgia, USA, 10 pages.
Steven McCanne and Van Jacobson, "The BSD Packet Filter: A New Architecture for User-Level Packet Capture", Winter USENIX conference, San Deigo, CA, 1993, Dec. 19, 1992, pp. 1-11.

(Continued)

*Primary Examiner*—Rupal Dharia
*Assistant Examiner*—Nicholas Taylor
(74) *Attorney, Agent, or Firm*—Gibb I.P. Law Firm, LLC; Pete Tennent, Esq.

(57) ABSTRACT

The present invention relates to a traffic analysis method and tool for a network based on TCP/IP or UDP/IP or a combination thereof comprising passive monitoring means at intermediate nodes of the network, and estimation means to determine a full set of network traffic metrics connected to said passive monitoring means.

The instant invention also provides a configured computer program product for carrying out the above method.

24 Claims, 11 Drawing Sheets

OTHER PUBLICATIONS

Vern Paxson, "Automated Packet Trace Analysis of TCP Implementations", Proceedings of ACM SIGCOMM'97, Cannes, France, 13 pages.

G. Robert Malan and Farnam Jahanian, "An Extensible Probe Architecture for Network Protocol Performance Measurement", Proceedings of the ACM SIGCOMM'98, 13 pages.

V. Jacobson, C. Leres, and S. McCanne, The Tcpdump Manual Page, Lawrence Berkeley Laboratory, Berkeley, CA 1990. http://ftp.ee.lbl.gov/tcpdump.tar.Z, 14 pages.

Libpcap, http://www-nrg.ee.lbl.gov/libpcap.tar.Z; www.tuxfinder.com/thematic/search.php3?q=libpcap, 3 pp.

Coral Reef, http://www.caida.org/Tools/CoralReef.

W. Richard Stevens, TCP/IP Illustrated, vol. 1 (The Protocols), Addison-Wesley, 1999, cover page.

[The BPF Manual Page] Appendix A The tcpdump Program, pp. 491-497.

[SIMULATOR] http://www.isi.edu/nsnam/ns/ns-documentation.html.

* cited by examiner

INTERNET TRAFFIC ANALYSIS TOOL

FIELD OF THE INVENTION

The present invention relates to Internet traffic analysis tool, which manages internet traffic by estimating metrics at internet nodes.

BACKGROUND OF THE INVENTION

In the recent years, the Internet has emerged as the most important vehicle for the transport of information services. Most organizations connect to the Internet through Internet Service Providers (ISPs). The number of ISPs is continuously increasing and so is the number of networks connected to an individual ISP. This network complexity requires new administrative tools for network management which makes it necessary to study the various characteristics of the network, to study the utilization patterns of the links and to maintain an account of per user utilization of network resources. This has fueled the need to compute/estimate important metrics by monitoring Internet traffic at Internet nodes. These metrics could be any of the following:
Goodput
Throughput
Link utilization
Fraction of packet losses
Number of retransmitted packets
Duplicate packets
Round trip time (RTT)

Goodput on a link is the total unique data in bytes transmitted per unit time over the link. Goodput excludes duplicate data generated due to packet retransmissions. Packet retransmission is common in protocols such as TCP and is caused by losses in the network.

Throughput on a link is the total number of bytes transferred per unit time over the link.

However, for protocols such as UDP, where no packet is retransmitted, throughput and goodput refer to the same quantity. Hence, for TCP traffic goodput is a more accurate measure of the effective link utilization than throughput.

Duplicate bytes on a link are transmitted more than once on that link. This happens because of retransmission of data, when data is lost in the network due to congestion or due to lossy links.

Losses refer to bytes that do not reach their destination. Losses occur in the network due to buffer overflow, queue management and admission control and on links due to errors in packet transmission over the links. A good estimate of the losses at different points in the network can help in efficient network administration.

A good estimation of the above metrics can be extremely useful in network management. These metrics are easily estimated at the end-nodes (i.e. the source node and the destination node) where all the information is available.

Existing Tools for Internet Data Analysis:

We discuss some important existing tools that monitor internet traffic and their limitations.

Ping [STEVENS] is an elementary tool which sends ICMP echo packets to a host and estimates the Round Trip Times (RTTs) and the losses of these ICMP packets. Built on similar lines, Traceroute [STEVENS] sends UDP probe packets with varying values of the Time-To-Live (TTL) field to find the entire path from the source to the destination and also the RTTs corresponding to each hop on the path.

Like Traceroute, Pathchar [PATHCHAR] takes advantage of the TTL field of the IP packet header to estimate the RTTs from the source to each hop on the path to the destination. Using these it then estimates the latency, bandwidth and queueing delays of each link on the path.

Limitations of Prior Art (Active):

One major drawback of the above tools is that they are active, i.e., they inject packets into the network to measure its state, thereby altering the state of the network. The act of observing the network should not directly interfere with or add to network activity. Secondly, the metrics which are estimated by these tools are solely on the basis of those packets which they inject into the network. These metrics, hence, may not reflect the true state of the network.

We now look at some existing passive tools. One of the most widely used tools for Internet protocol monitoring is tcpdump [TCPDUMP]. Tcpdump acquires network frames from the underlying filter and can either store these in the binary or output the frame's IP protocol header contents in ASCII. Tcpdump obtains a copy of the packet from Libpcap [LIBPCAP].

Libpcap is a utility developed for Linux and BSD which provides easy access to captured packets. The packets are actually obtained using the Berkeley Packet Filter (BPF) [BPF] which puts the Network Interface Card (NIC) in a promiscuous mode.

Paxson's TCPanaly [PAXSON] is an offline tool for analyzing TCP traces. It classifies TCP implementations based on characteristics seen in their traces. In order to classify a TCP connection, TCPanaly must make two passes over the data stream.

Coral Reef [CORAL] is distributed by Caida [CAIDA99] and is based on OC3MON. It captures low-level protocol headers over serial ATM networks trunks for post analysis. OC3MON is currently used for capturing IP, UDP and TCP headers at points in the vBNS network.

Windmill [WINDMILL], developed at University of Michigan, reconstructs application-level network protocols and exposes the underlying protocols' events. The packets are filtered by Windmill packet filter (WPF). Then a set of protocol modules extracts the various parameters.

Limitations of Prior Art (Passive):

None of the above passive tools calculate metrics such as goodput and duplicate packets. These parameters can be very useful in network management.

THE OBJECT AND SUMMARY OF THE INVENTION

The object of the invention is to obviate the above drawbacks by estimation of the metrics by passive monitoring of traffic at intermediate nodes in the internet, e.g., the Internet Service Providers (ISPs).

To achieve the said objective this invention provides a traffic analysis tool for a network based on TCP/IP or UDP/IP or a combination thereof comprising:
  passive monitoring means at intermediate nodes of the network, and
  estimation means to determine a full set of network traffic metrics connected to said passive monitoring means The said passive monitoring means is TCPdump, TCPanaly, Coral Reef, Windmill or any other similar means which makes a copy of the monitored packet and extracts information about the connection (source and destination address and port numbers) and the packet sequence number.

The said full set of network traffic metrics includes:
  goodput
  throughput
  link utilization fraction or percentage of lost packets
number or fraction or percentage of retransmitted packets
number of duplicate packets
round trip time The said estimation means is based on analysis of the correlation between sequence numbers of the monitored packets both for forward (data packets) and reverse (acknowledgement packets) packet streams.

The said estimation means includes a mechanism for determining goodput by aggregating the number of bytes in all relevant packets received at the node in unit time and deducting from said aggregate the aggregate of the number of bytes in packets that arrive more than once in said unit time.

The said estimation means includes a mechanism for determining throughput by aggregating the number of bytes in all relevant packets received at the node in unit time.

The said estimation means includes a mechanism for determining link utilization by calculating the ratio of the aggregate link throughput to the capacity of the link.

The said estimation means includes a mechanism for determining retransmission by:
 maintaining a count of the number of 'Acks' received for each transmitted packet, with an 'Ack' count of 4 being indicative of a retransmission, or
 detecting retransmissions due to timeout or shrinking of transmission window by identifying when the transmission enters a slow start phase.

The slow start phase is identified by means determining when the inter-packet time difference is greater than a defined multiple of the average inter-packet time difference.

The said estimation means determines duplicate packets by a mechanism for identifying packets bearing the same packet number.

The said estimation means determines round trip time by a mechanism for calculating the average time interval between the receipt of a packet and the receipt of its acknowledgement.

The said estimation means determines lost packets by a mechanism for identifying packets for which an additional packet bearing the same packet sequence number is received prior to the receipt of the 'ACK' and the time interval between the receipt of the second packet and the receipt of the 'ACK' is comparable to the estimated round trip time.

The above tool is applied to the packets pertaining to an individual connection.

The above tool is applied to packets pertaining to a selected set of connections or to the aggregate of all connections at the node.

The present invention also provides a traffic analysis method for a network based on TCP/IP or UDP/IP or a combination thereof comprising:
 monitoring passively at intermediate nodes of the network, and
 estimating a full set of network traffic metrics.

The said passive monitoring is through TCPdump, TCPanaly, Coral Reef, Windmill or any other similar method which makes a copy of the monitored packet and extracts information about the connection (source and destination address and port numbers) and the packet sequence number.

The said full set of network traffic metrics includes:
 goodput
 throughput
 link utilization
 fraction or percentage of lost packets
 number or fraction or percentage of retransmitted packets
 number of duplicate packets
 round trip time The said estimation is based on analysis of the correlation between sequence numbers of the monitored packets both for forward (data packets) and reverse (acknowledgement packets) packet streams.

The said estimation includes determining goodput by aggregating the number of bytes in all relevant packets received at the node in unit time and deducting from said aggregate the aggregate of the number of bytes in packets that arrive more than once in said unit time.

The said estimation includes determining throughput by aggregating the number of bytes in all relevant packets received at the node in unit time.

The said estimation includes determining link utilization by calculating the ratio of the aggregate link throughput to the capacity of the link The said estimation includes determining retransmission by:
 maintaining a count of the number of 'Acks' received for each transmitted packet, with an 'Ack' count of 4 being indicative of a retransmission, or
 detecting retransmissions due to timeout or shrinking of transmission window by identifying when the transmission enters a slow start phase.

The slow start phase is identified by determining when the inter-packet time difference is greater than a defined multiple of the average inter-packet time difference.

The said estimation determines duplicate packets for identifying packets bearing the same packet number.

The said estimation determines round trip time for calculating the average time interval between the receipt of a packet and the receipt of its acknowledgement.

The said estimation determines lost packets for identifying packets for which an additional packet bearing the same packet sequence number is received prior to the receipt of the 'ACK' and the time interval between the receipt of the second packet and the receipt of the 'ACK' is comparable to the estimated round trip time.

The above method is applied to the packets pertaining to an individual connection.

The above method is applied to packets pertaining to a selected set of connections or to the aggregate of all connections at the node.

The instant invention also provides a computer program product comprising computer readable program code stored on computer readable storage medium embodied therein for traffic analysis for a network based on TCP/IP or UDP/IP or a combination thereof comprising:
 computer readable program code means configured for monitoring passively at intermediate nodes of the network,
 computer readable program code means configured for estimating a full set of network traffic metrics.

The said computer readable program code means configured for passive monitoring is through TCPdump, TCPanaly, Coral Reef, Windmill or any other similar means which makes a copy of the monitored packet and extracts information about the connection (source and destination address and port numbers) and the packet sequence number.

The said full set of network traffic metrics includes:
 goodput
 throughput
 link utilization
 fraction or percentage of lost packets
 number or fraction or percentage of retransmitted packets
 number of duplicate packets round trip time The said computer readable program code means configured for estimating is based on analysis of the correlation between sequence numbers of the monitored packets both for forward (data packets) and reverse (acknowledgement packets) packet streams.

The said computer readable program code means configured for estimating includes determining goodput by aggregating the number of bytes in all relevant packets received at the node in unit time and deducting from said aggregate the aggregate of the number of bytes in packets that arrive more than once in said unit time.

The said computer readable program code means configured for estimating includes determining throughput by aggregating the number of bytes in all relevant packets received at the node in unit time.

The said computer readable program code means configured for estimating includes determining link utilization by calculating the ratio of the aggregate link throughput to the capacity of the link The said computer readable program code means configured for estimating includes determining retransmission by:
  maintaining a count of the number of 'Acks' received for each transmitted packet, with an 'Ack' count of 4 being indicative of a retransmission, or
  detecting retransmissions due to timeout or shrinking of transmission window by identifying when the transmission enters a slow start phase.

The slow start phase is identified by determining when the inter-packet time difference is greater than a defined multiple of the average inter-packet time difference.

The said computer readable program code means configured for estimating determines duplicate packets by a mechanism for identifying packets bearing the same packet number.

The said computer readable program code means configured for estimating determines round trip time by a mechanism for calculating the average time interval between the receipt of a packet and the receipt of its acknowledgement.

The said computer readable program code means configured for estimating determines lost packets for identifying packets for which an additional packet bearing the same packet sequence number is received prior to the receipt of the 'ACK' and the time interval between the receipt of the second packet and the receipt of the 'ACK' is comparable to the estimated round trip time.

The above computer program product is applied to the packets pertaining to an individual connection.

The above computer program product is further applied to packets pertaining to a selected set of connections or to the aggregate of all connections at the node.

BRIEF DESCRIPTION OF THE DRAWINGS:

The invention will now be described with reference to the accompanying drawings.

DETAILED DESCRIPTION OF THE DRAWINGS

Figure 1A:
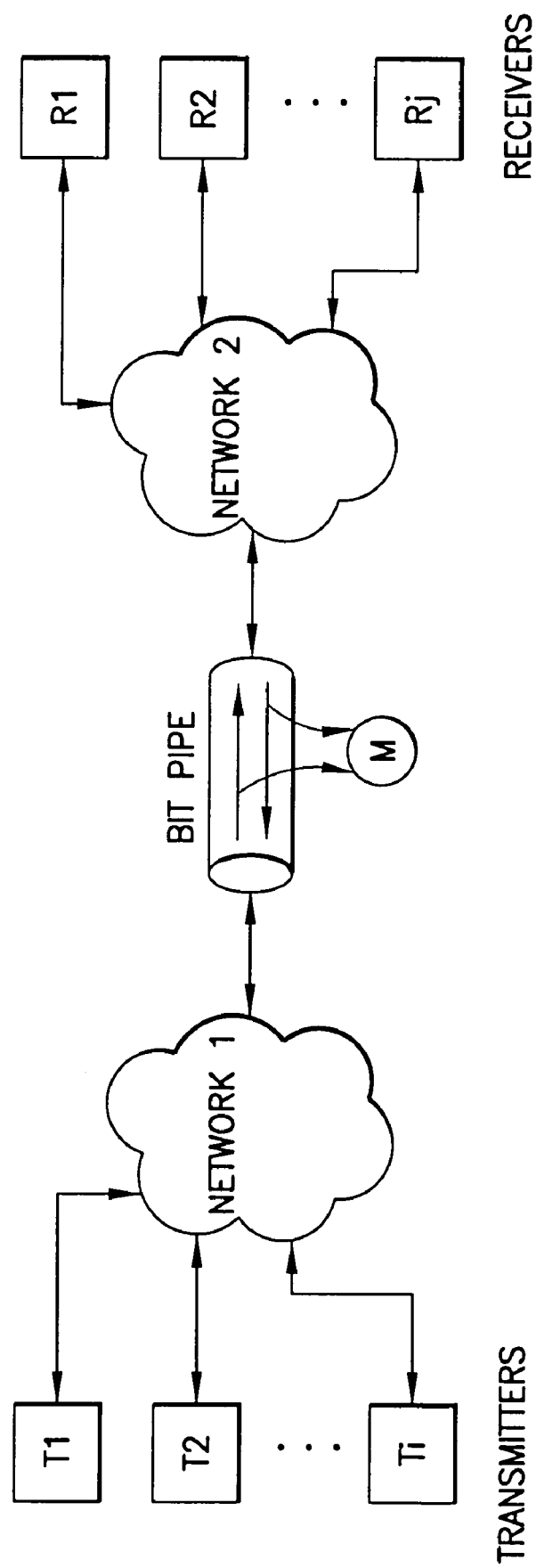
FIG. 1(a) shows a monitoring tool (M) measuring traffic across the bit pipe in the Internet
Figure 1B:
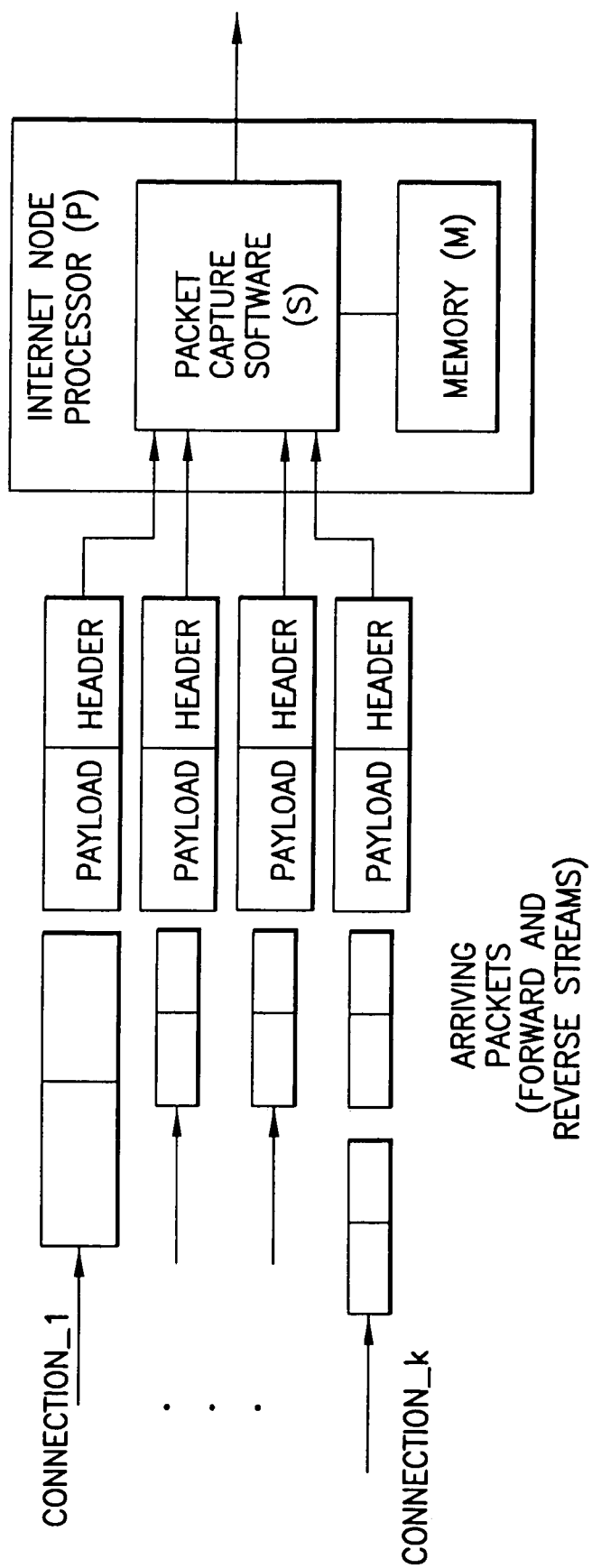
FIG. 1(b) shows a packet capture software (or monitoring S/w) at an Internet Node
Figure 2:
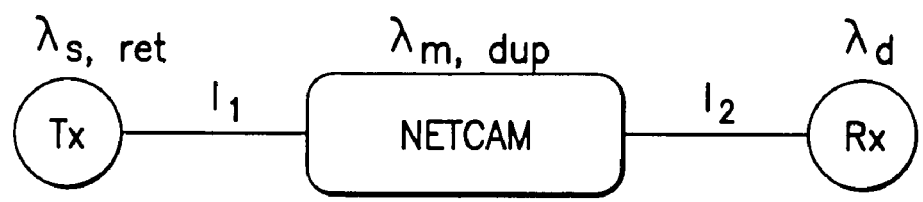
FIG. 2 shows equivalent Architecture of a Connection as seen by NETCAM

FIG. 1(a) shows an intermediate node (M) of an internet network. A node refers to any of the following:
  any node that connects the end-users with a high-speed backbone network
  an intermediate node such as an Internet Service Provider (ISP)
  an edge server
  an Internet router
  a LAN router The internet traffic is any of the following:
  TCP/IP
  UDP/IP
  Mix of TCP and UDP FIG. 1(b) shows the monitoring system at the intermediate node, which monitors packets (TCP/IP, UDP/IP) for both the forward direction and for the reverse direction (i.e., the TCP/IP acknowledgements) for connections passing through it. The monitoring system consists of:
  1. A processor (P)
  2. Memory module (m) within the processor. This is required to store connection (or flow) state information. This information could be, for example, the four-tuple that characterizes an Internet connection: source IP address, destination IP address, source port number and destination port number.
  3. Software (S) to monitor internet packets utilizing the above processor. For example, such software could be the TCPdump software [TCPdump]. TCPdump monitors the TCP traffic in a promiscuous mode, i.e., it makes a copy of the header of each TCP packet and uses the information in the TCP header intelligently.
  4. A filter (not shown) with the software. A filter monitors only a pre-specified set of connections passing through the node.
  5. Software (not shown) for calculating and reporting Internet traffic metrics FIG. 2 shows a monitoring system (NETCAM) according to this invention at an intermediate node in an Internet. Note that NETCAM can be placed at any node, including the end-points (Tx and Rx). Since the nodes at the end-points have more information about the state of a TCP connection, it is more meaningful to place NETCAM at an intermediate node. Such a node could for example be an Internet Service Provider (ISP) through which large volume of traffic flows between the end-users and the backbone network.

NETCAM is a passive monitoring tool that analyses all TCP packets passing through a link and identifies the various TCP events such as timeouts and fast retransmissions to infer information about individual connections. It estimates per connection or aggregate traffic metrics. The parameters so estimated are then aggregated to give the link characteristics.

The Internet metrics that are estimated are:
Goodput
Fraction of lost packets at a link or percentage of lost packets at a link
Number of duplicate packets
Number of retransmitted packets
Throughput Note that these metrics are not new and have been studied in the literature. However, no existing system estimates these metrics at Internet nodes using passive monitoring.

The invention estimates the metrics at intermediate nodes such as an ISP or a LAN router. It can also be placed at end-points (i.e., the source and a destination) where all the information is available.

For each connection (or flow), the monitoring system examines both the forward stream (data packets) and the reverse stream (ACK packets) and uses the Sequence Number information in the packet headers to estimate the parameters.

By analyzing the sequence number of the packets traversing a node, the system at the node can estimate the above-mentioned metrics.

The invention estimates the above-mentioned metrics both on a per connection as well on an aggregate basis.

A filter along with the software at an Internet node can select packets belonging to a set of pre-specified connections/flows.

Some of these metrics are estimated directly at a node in the Internet whereas the other metrics are derived from the estimated metrics using rate conservation laws.

The monitoring system placed at the internet nodes does not disturb the Internet traffic and is therefore "passive" in nature. It makes a copy of the TCP packets (using existing software, e.g., TCPdump [TCPDUMP]) and peeks at the TCP/IP headers to get information about connections (e.g., source and destination IP address, source and destination port numbers) and the TCP Sequence Numbers.

The Internet metrics are computed and updated for each arriving packet of a connection. The filter at the node will catch most of the packets but may occasionally miss some packets.

Metrics

We define the following notations that will be used throughout the disclosure.

$\lambda_s$: Throughput at the source
$\lambda_m$: Throughput at the monitoring tool
$\lambda_d$: Throughput at the destination (equal to the end-to-end throughput)
$\gamma_s$: Goodput at the source
$\gamma_m$: Goodput at the monitoring tool
$\gamma_d$: Goodput at the destination
$1_1$=losses between source and the monitoring tool
$1_2$=losses between monitoring tool and destination
ret=Retransmitted bytes by Source
$dup_m$=duplicate bytes seen at the monitoring tool
$dup_d$=duplicate bytes seen at the destination
$rtt_1$=Round trip time from the source to the monitoring tool
$rtt_2$=Round trip time from monitoring tool to destination
Relationship Between the Above Metrics
(I)

$$\text{Total bytes transmitted by source} = \gamma + ret \quad \text{(Equation 1)}$$

$$\text{Total bytes transmitted by source} = \gamma + 1_1 + dup_m \quad \text{(Equation 2)}$$

From Equation 1 and Equation 2 above, $$ret = 1_1 + dup_m$$

(II)

$$\text{Total bytes seen by Monitoring Tool} = \gamma + dup_m \quad \text{(Equation 3)}$$

$$\text{Total bytes seen by Monitoring Tool} = \gamma + dup_d + 1_2 \quad \text{(Equation 4)}$$

From Equation 3 and Equation 4 above, $$dup_m = dup_d + 1_2$$

Estimation of the Parameters
Estimation of Throughput and Goodput:

Since NETCAM examines all the packets for a connection, measuring the throughput implies incrementing it by the length of the packet seen. It is also easy to identify the packets that arrive at NETCAM more than once. Hence, estimating the goodput and throughput amounts to counting the number of bytes that are seen at NETCAM.

Also note that, $$\lambda_s = \lambda_m + 1_1$$

Having measured $\lambda_m$ at NETCAM, it is easy to estimate the throughput at the source ($\lambda_s$) once we have estimated the losses at link 1 ($1_1$).

Also note that, $$\lambda_m = \lambda_d + 1_2$$

Having measured $\lambda_m$ at NETCAM, it is easy to estimate the throughput at the destination ($\lambda_d$) once we have estimated the losses at link 2 ($1_2$).

Estimation of Duplicate Packets:
From Equation set (I)

$$ret = 1_1 + dup_m$$

We measure $dup_m$ with the help of NETCAM. We now need to estimate one of ret or $1_1$ to be able to estimate all the parameters.

Although any of $1_1$ or ret can be estimated, we describe a method to estimate ret and solve for the $1_1$, ret, $\lambda_s$ metrics.
From Equation set (II)

$$dup_m = dup_d + 1_2$$

We measure $dup_m$ with the help of NETCAM. We now need to estimate one of $dup_d$ or $1_2$ to be able to estimate all the parameters.

Although any of $1_2$ or $dup_d$ can be estimated, we describe a method to estimate $1_2$ and solve for $1_2$, $dup_d$, $\lambda_d$ metrics.

We also estimate the round trip time from the NETCAM (monitoring tool) to the destination, i.e., $rtt_2$.

This estimation is done by a simple moving window averaging of time difference of packet and corresponding ack at the monitoring tool.

Estimation of Retransmissions (ret)

Figure 3:
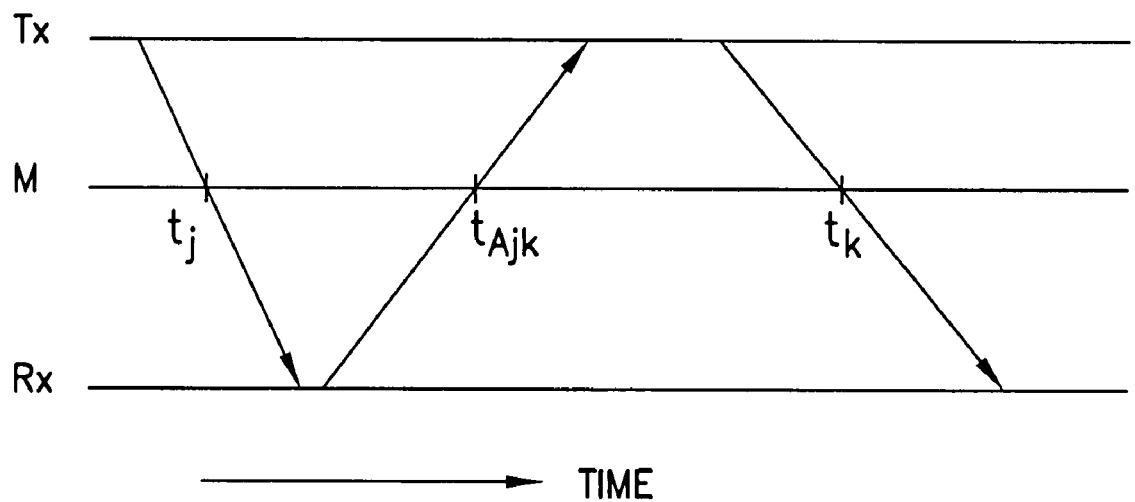
FIG. 3 shows timeline of Events to Detect the Slow Start Phase

FIG. 3 shows a Timeline of Events to Detect the Slow Start Phase.

For a TCP connection, retransmissions from the source can be due to one of the following:
(i) Fast retransmissions due to three duplicate ACKs
(ii) Retransmissions due to timeout
(iii) Retransmission due to shrink of TCP windows Fast Retransmissions due to duplicate ACKs are easily estimated by maintaining a count of number of ACKs received for each received packet. As soon as the fourth ACK for a particular packet is received, the packet is considered to be retransmitted once and size of packet (in bytes) is added to ret. It may happen that the duplicate ACKs received at NETCAM are lost before reaching the source. However, usually there are more than three duplicate ACKs and hence we get to know that the packet is retransmitted. Our tests show a 100% accurate estimation of this type of retransmitions.

Whenever a timeout occurs, the window size of the TCP connection drops to one packet and the TCP connection enters the slow start phase. Retransmissions due to timeouts are thus detected by identifying the slow start phase of a TCP connection. We identify when TCP window starts growing from a packet of size one.

Besides, all the packets of the window, transmitted after the packet due to which the timeout occured, are also retransmitted. These retransmissions fall in third category mentioned above (i.e., retransmissions due to shrink of TCP windows).

When a TCP connection enters slow start, the following events are seen in succession at NETCAM (M). This is shown clearly in FIG. 3.

(i) At time $t_j$ a packet with sequence number j is seen at NETCAM.

(ii) At time $t_{Ajk}$ the first ACK acknowledging j and requesting k is seen at NETCAM.

(iii) At time $t_k$ the packet with sequence number k,(k>j), is the immediate next packet of this connection seen at NETCAM. This packet is also the first data packet to be seen after the data packet with sequence number j.

We also maintain an average "smooth inter-packet time difference", $t_{avg}$, and if the difference between $t_j$ and $t_k$ is greater than $\beta*t_{avg}$, and the above three conditions hold, we consider it as slow-start event. We have chosen the value of $\beta$ to be equal to 2. Therefore, by estimating the slow-start event we can count the timeout due to slow start. Note that all the above conditions are necessary, but not sufficient for slow-start. This might result in some over-estimation. Keeping $t_{avg}$ helps in removing over-estimation due to long inter packet delays.

Estimation of Losses at Link 2 ($L_2$)

Figure 4:
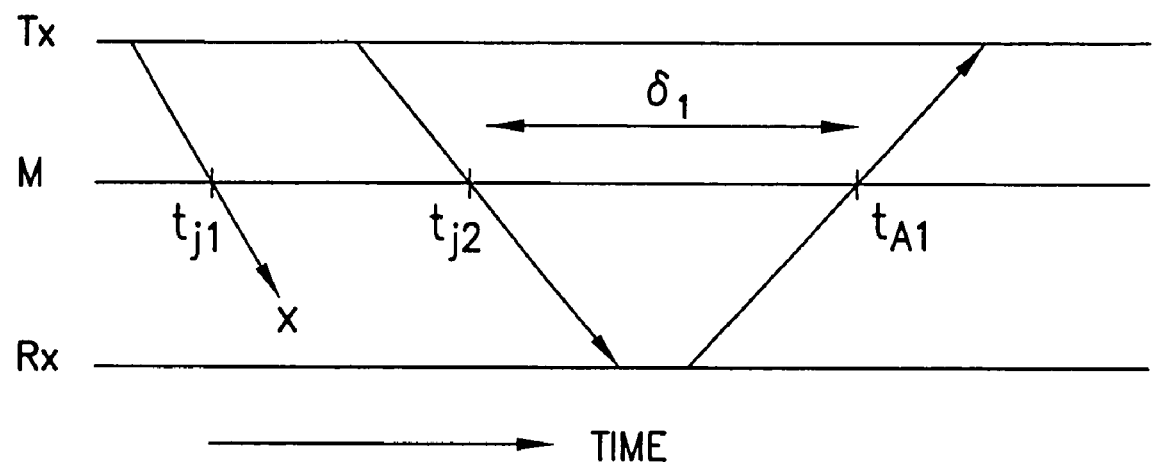
FIG. 4 shows timeline of Events to Detect losses between the monitoring tool and the destination ($L_2$).

FIG. 4 shows timeline of Events to Detect $L_2$.

A packet lost between NETCAM (M) and the destination contributes to $L_2$.

Such a packet will be seen atleast twice at NETCAM and the sequence of events that will take place will be as follows:

(i) At time $t_{j1}$ a packet with sequence number j is seen at NETCAM.

(ii) At time $t_{j2}$, before an ACK that acknowledges j arrives, another packet with sequence number j arrives at NETCAM.

(iii) At time $t_{A1}$, the first ACK acknowledging j is seen at NETCAM.

The time line for the above events is shown in FIG. 4.

This sequence of events is necessary but not sufficient to detect $L_2$. If we use this method to detect $L_2$, then we may overestimate $L_2$ in cases when the first packet transmitted from NETCAM gets delayed or the ACK coming back is delayed (FIG. 4). We maintain an estimate of $rtt_2$ for each connection and to make sure that we detect the actual losses, we compare the time difference between the second and the third event to this estimated value of $rtt_2$. This is done to ensure that the ACK received was in response to the last packet with sequence number j seen at NETCAM.

$\delta_\tau = t_{A1} - t_{j2}$

Formally, $\delta_\tau > a*rtt_2$, where a is a parameter depending on the variance in $rtt_2$. Values of a such that $0.7 < a < 1.0$ work well in most of the cases.

Figure 5:
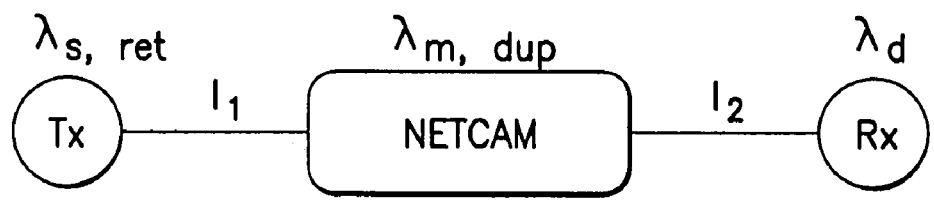
FIG. 5 illustrates a single TCP connection originating at Tx and terminating at Rx and passing through NETCAM.

Preferred Embodiment of the Invention:

FIG. 5 shows a single TCP connection originating at Tx and terminating at Rx and passing through NETCAM.

Bandwidth of the links: 5 Mbps
Delay at Link 1 (Source to NETCAM): 30 msec
Delay at Link 2 (NETCAM to Destination): 30 msec
Simulation time: 60 secs
End-to-end random loss rate: 5%
Maximum queue size at NETCAM: 200 TCP packets
Packet drop policy at NETCAM: Tail Drop
Size of a TCP packet: 512 bytes
TCP version: TCP New Reno with a normal receiver (no delayed ACKS)
Connection Type: Persistent ftp connections The above system is tested on Network Simulator (NS) [NSIMULATOR] traces. NETCAM measures the metrics for each TCP connection independently and then aggregates them to give the metrics for the entire link. The application used in the case study is the well known ftp protocol. Packets in ftp use the TCP protocol to transfer data from the source to the destination.

Figure 6:
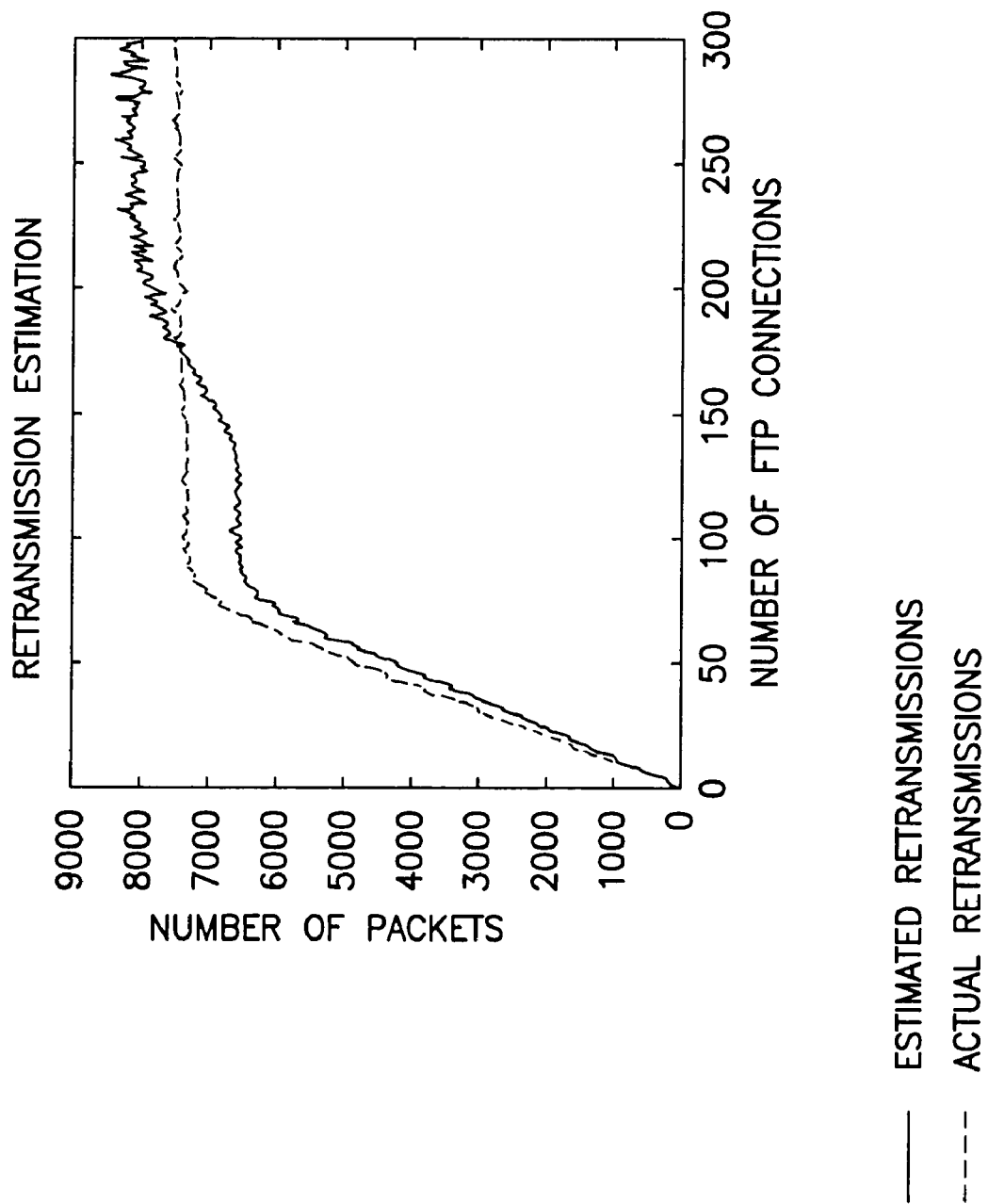
FIG. 6 shows a graph of Estimated and Actual Retransmissions versus Number of ftp Connections

FIG. 6 shows the retransmissions (both actual and estimated by NETCAM) versus the number of ftp connections. The estimated value of the number of retransmissions is observed to be slightly lower than the true value upto 50 ftp connections. As the number of ftp connections increases beyond 50, Tail Drop from the FIFO at NETCAM induces some packet losses. Thus, after 50 ftp connections, the difference between the actual and the estimated value increases. The overestimation after 175 ftp connections maybe due to a poor estimation of the TCP timeout event.

Figure 7:
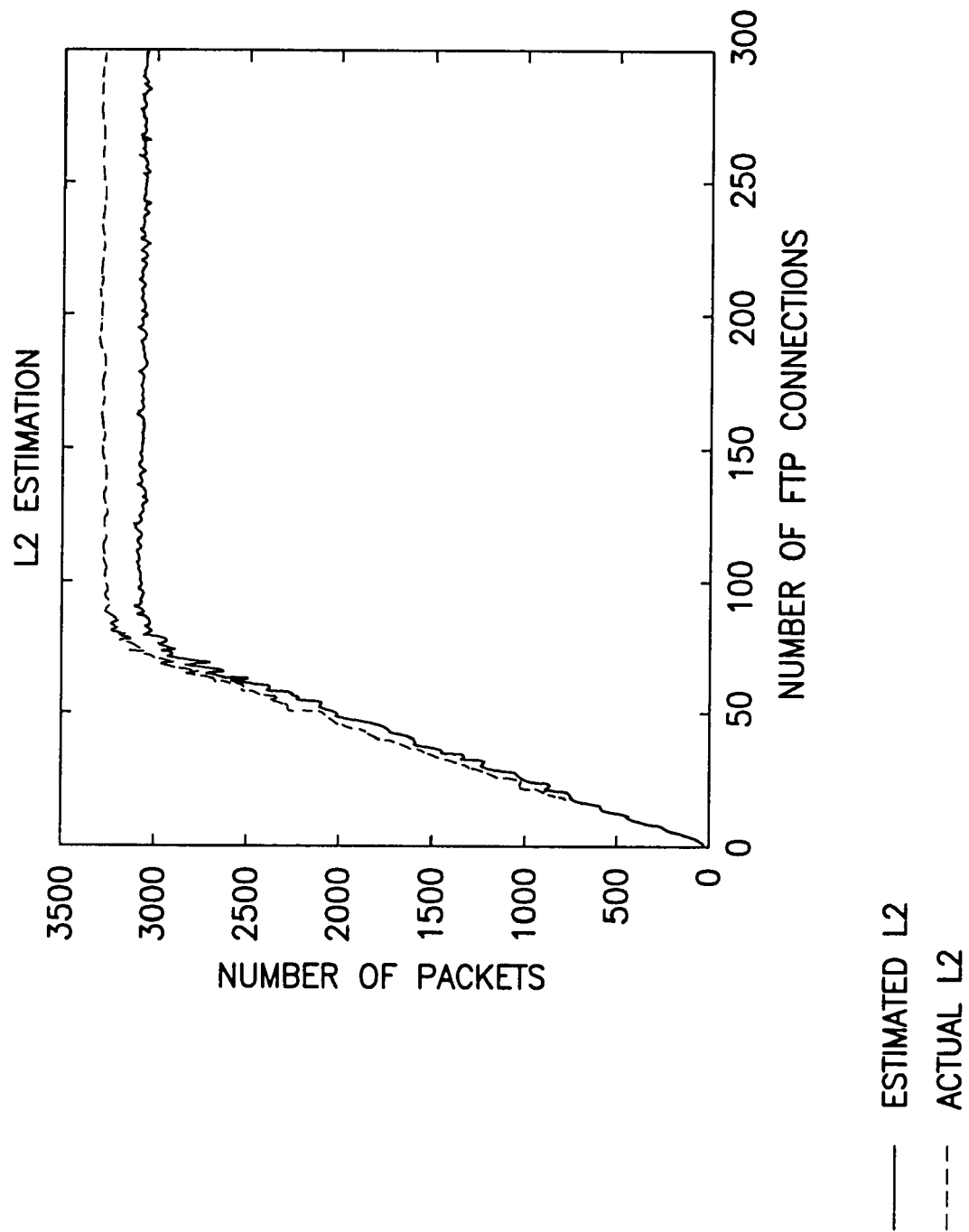
FIG. 7 depicts a graph of losses in Link 2 (Estimated and Actual) versus Number of ftp Connections.

FIG. 7 shows packet losses (both estimated and actual) in link 2 (i.e., the link from monitoring tool to the destination) versus the number of ftp connections. As seen from the figure, it is observed that the number of packet losses in link 2 increases with an increase in the number of ftp connections for both the estimated and actual values. This is to be expected. As the number of ftp connections increase, the difference between the estimated value and the actual value increase marginally. This is due to the increase in the number of packet drops due to Tail Drop.

Figure 8:
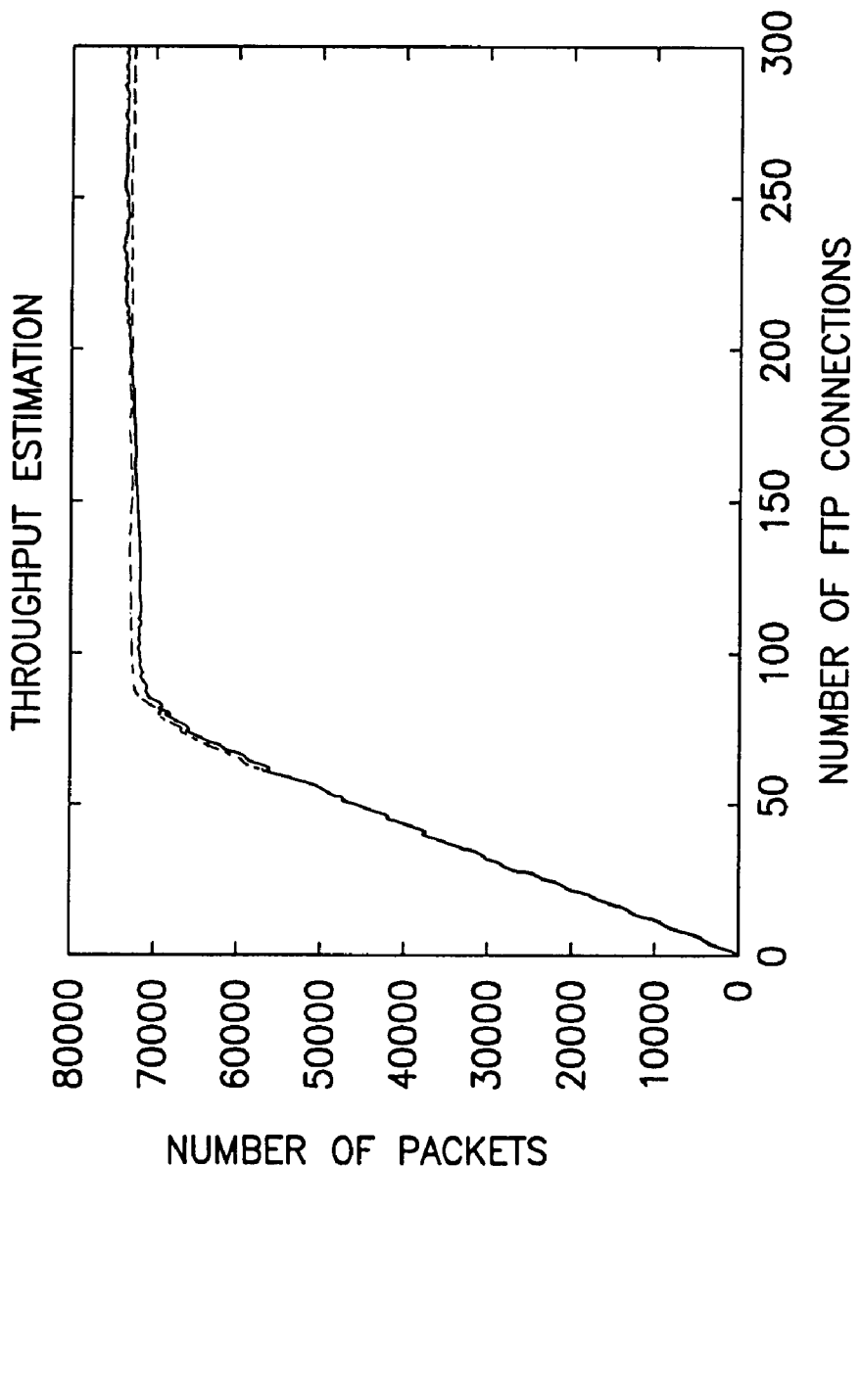
FIG. 8 shows a graph of end-to-end Throughput (Actual and Estimated) versus the Number of file transfer protocol (ftp) connections

FIG. 8 shows a plot of the end-to-end throughput of a TCP connection (for both actual and estimated values) versus the number of ftp connections. As expected, the throughput initially increases with an increase in the number of ftp connections. Beyond 90 to 100 ftp connections, the throughput saturates at a value that is limited by the capacity of the link.

Figure 9:
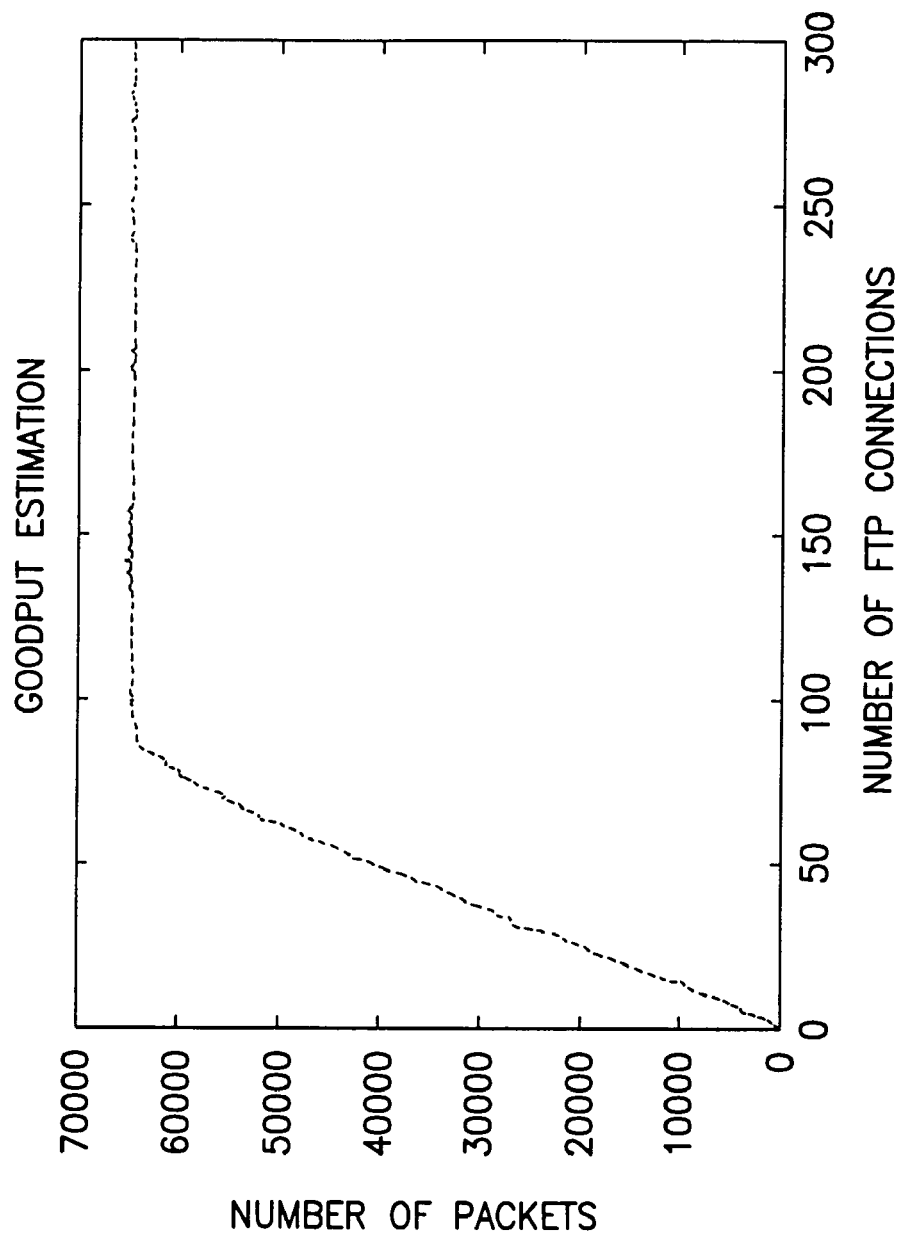
FIG. 9 shows a graph of Goodput (Actual and Estimated) versus the Number of file transfer protocol (ftp) Connections

FIG. 9 shows a plot of the goodput of a TCP connection (for both actual and estimated values) versus the number of ftp connections. As expected, the goodput initially increases with an increase in the number of ftp connections. Beyond 90 to 100 ftp connections, the goodput saturates at a value that is limited by the capacity of the link.

Figure 10:
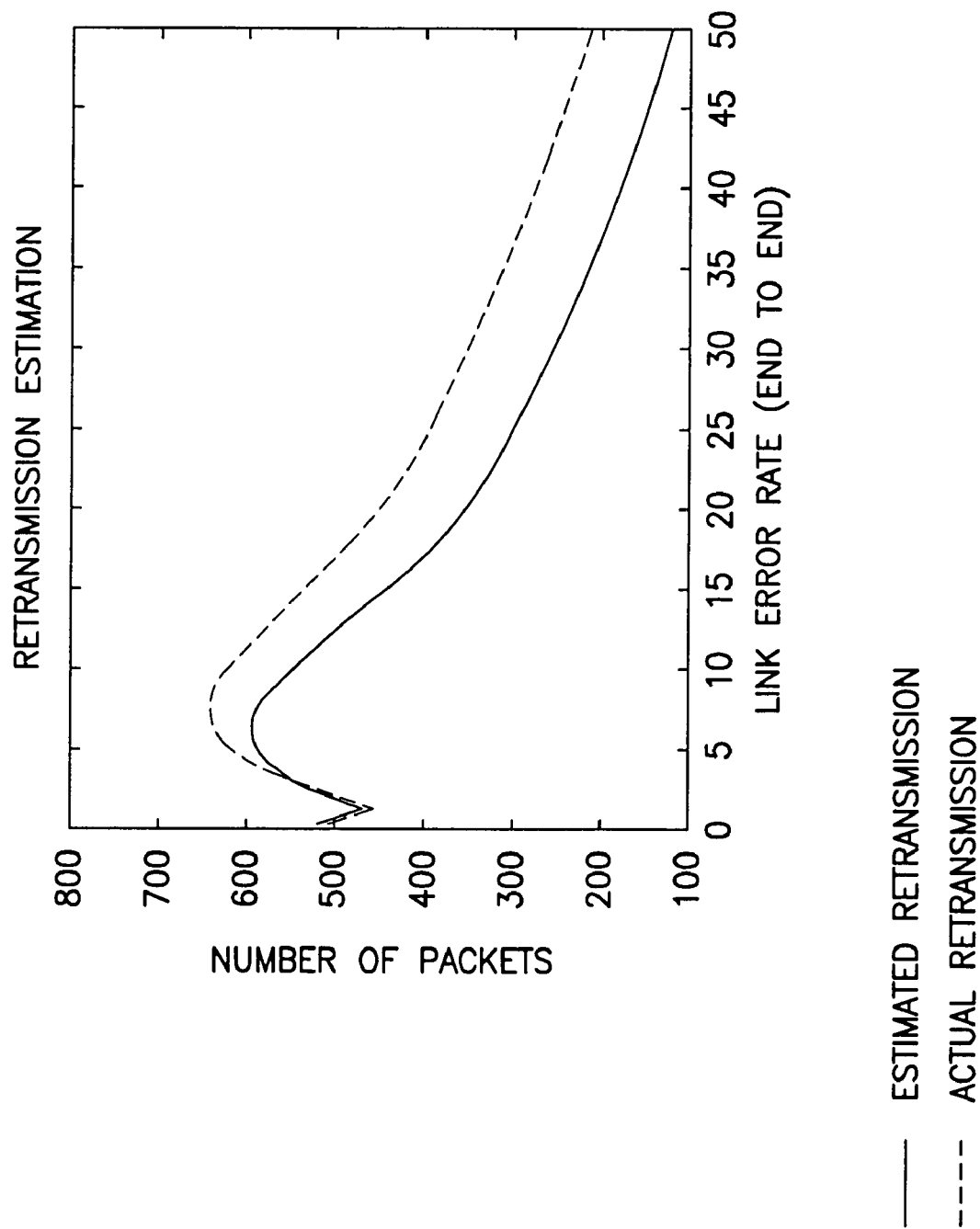
FIG. 10 shows a graph of Retransmissions (Estimated and Actual) versus the Link Error Rate

FIG. 10 shows a plot of the packet retransmissions (both estimated and actual) versus the link error rate. Note that the packet losses are also caused by the Drop Tail queue at NETCAM. We observe that initially, the number of retransmissions increase with an increase in the link error rate. Beyond a threshold (of link error rate), the number of retransmissions decrease due to the drop in throughput. This happens since only a few packets are passing through the gateway. Further, the error in estimation increases with the link error rate.

Figure 11:
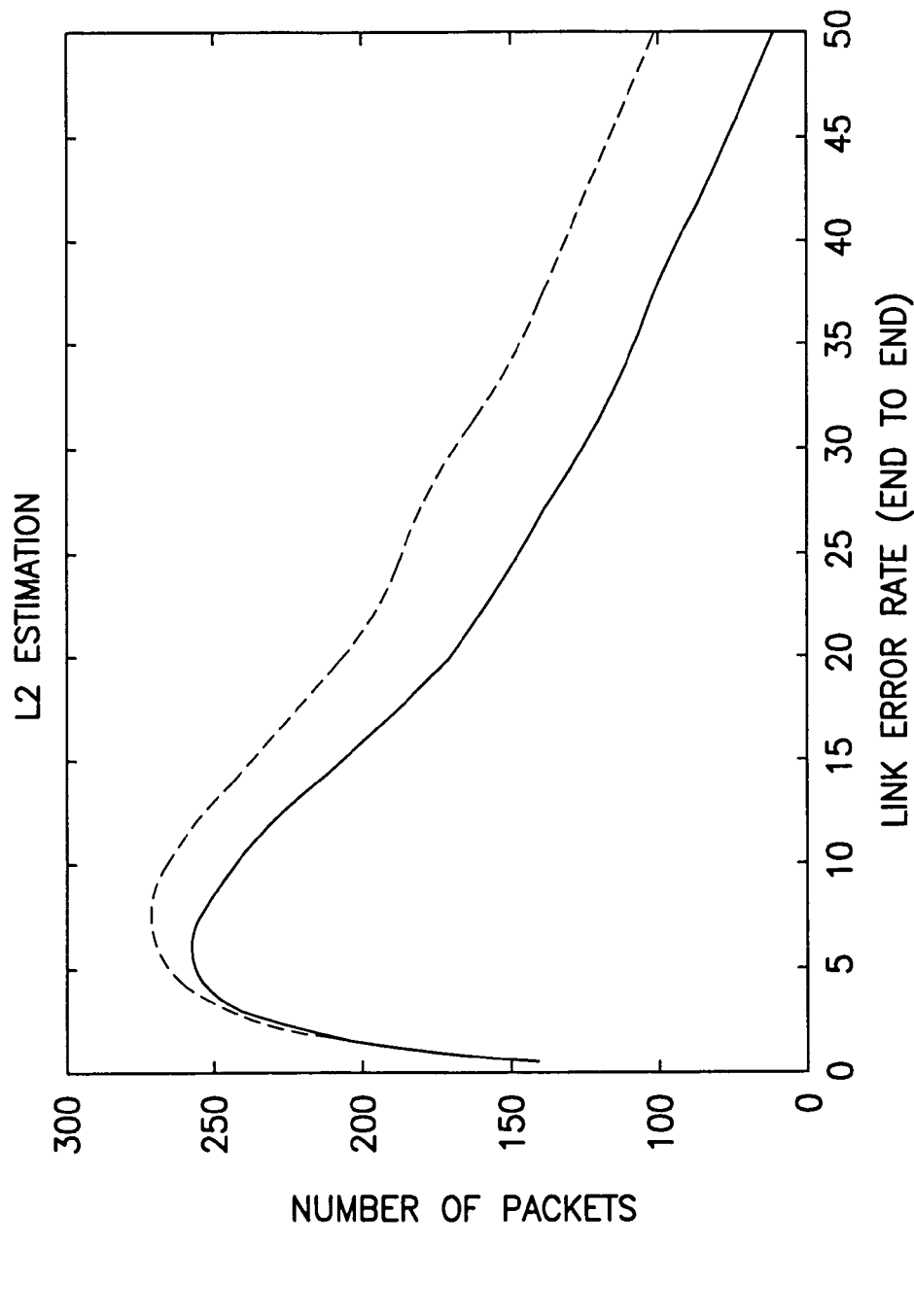
FIG. 11 depicts a graph of Losses at Link 2 (Estimated and Actual) versus the Link Error Rate

FIG. 11 shows a plot of the packet losses at link 2 (both estimated and actual) versus the link error rate. We observe that initially, the number of losses increase with an increase in the link error rate. Beyond a threshold (of link error rate), the number of losses at link 2 decrease. Further, the error in estimation increases with the link error rate.

Figure 12:
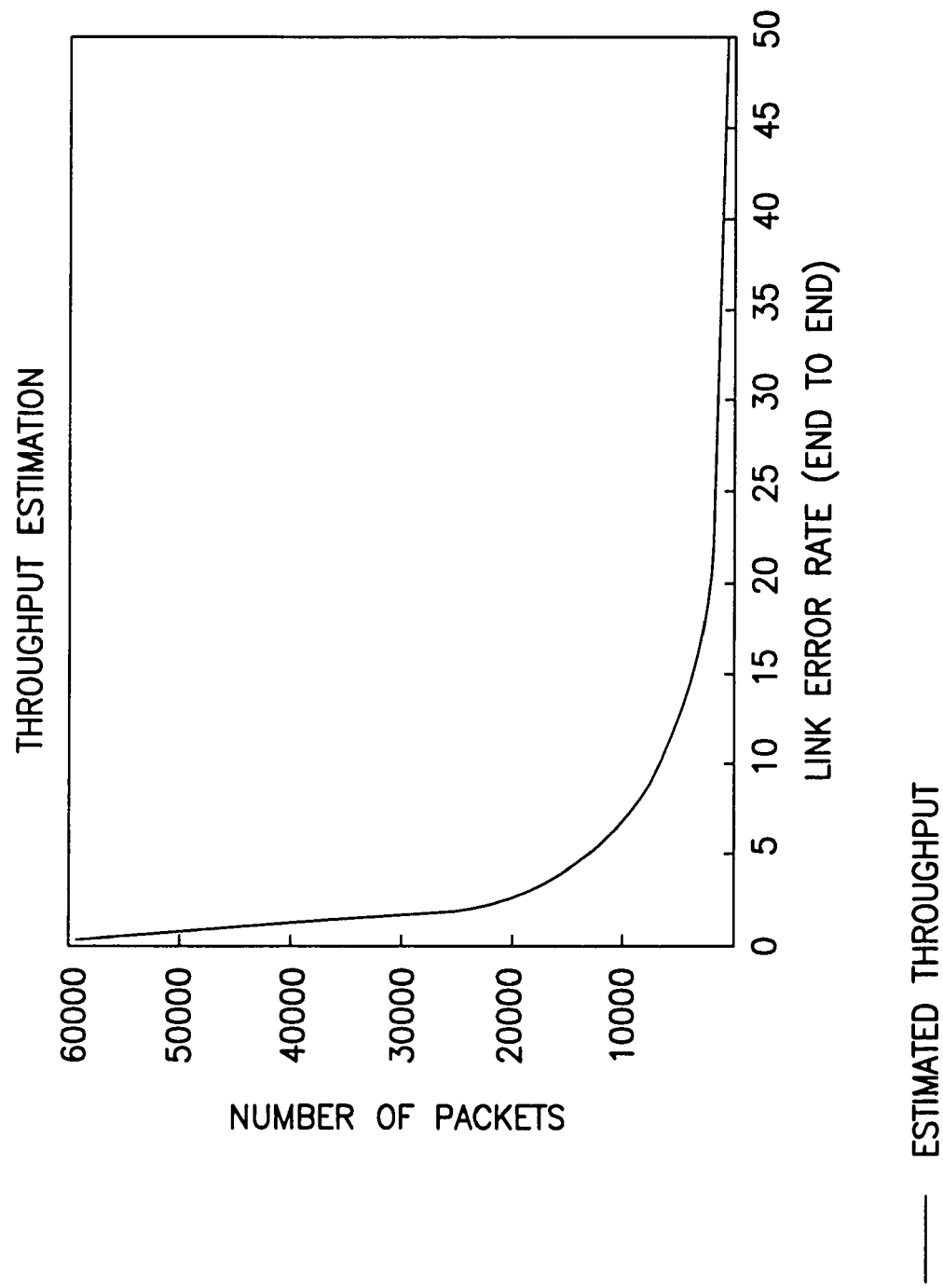
FIG. 12 shows a graph of End-to-end Throughput versus Link Error Rate (end-to-end)

FIG. 12 shows a plot of the end-to-end throughput (both estimated and actual) versus the end-to-end link error rate. As is expected, the throughput decreases with an increase in the link error rate. Moreover, the actual and the estimated value of the throughput matches very well.

Advantages of the Proposed Method
  To study the characteristics of the Internet traffic
  To study the utilization patterns of the Internet links
  To maintain an account of per user utilization of network resources
  To help network administrators pinpoint areas or network segments that pose potential problems, i.e., to determine which gateways, servers, or routers are being used heavily and may need added capabilities in the future.
  To develop a model for pricing the different users based on the network utilization.

The advantages of network management at intermediate nodes such as ISPs are:
  Large volumes of traffic flows through these nodes since these nodes are placed between the end-users and the Internet backbone
  Both the forward and the reverse (i.e., acknowledgement) streams of connections pass through such nodes References

[CAIDA99]"Internet Statistics and Metrics Analysis: Passive Measurement Data and Analysis", Workshop report, Jan. 14–15, 1999, San Diego, http://www.caida.org/ISMA/isma9901/report.html.

[KESHAV] S. Keshav, "An Engineering Approach to Computer Networking: ATM Networks, the Internet and the Telephone Network", Addison-Wesley, 1997.

[PATHCHAR] Allen B. Downey, "Using pathchar to estimate Internet link characteristics", http://www.cs.colby.edu/~downey/pathchar. In Proceedings of ACM SIGMETRICS'99, Atlanta, Ga., USA.

[BPF] Steven McCanne and Van Jacobson, The BPF Manual Page, Lawrence Berkeley Laboratory, Berkeley, Calif. 1990.

[BSDPF] Steven McCanne and Van Jacobson, The BSD packet Filter: A New Architecture for User-Level Packet Caapture, Winter USENIX conference, San Diego, Calif., 1993.

[PAXSON] Vern Paxson, "Automated Packet Trace Analysis of TCP Implementations", pp. 167–179, Proceedings of ACM SIGCOMM'97, Cannes, France.

[WINDMILL] G. Robert Malan and Farnam Jahanian, "An Extensible Probe Architecture for Network Protocol Performance Measurement", Proceedings of the ACM SIGCOMM'98.

[TCPDUMP] V. Jacobson, C. Leres, and S. McCanne, The Tcpdump Manual Page, Lawrence Berkeley Laboratory, Berkeley, Calif. 1990. ftp://ftp.ee.lbl.gov/tcpdump.tar.Z

[LIBPCAP] Libpcap, ftp://ftp.ee.lbl.gov/libpcap.tar.Z

[CORAL] Coral Reef, http://www.caida.org/Tools/Coral-Reef

[STEVENS] W. Richard Stevens, TCP/IP Illustrated, Volume 1 (The Protocols), Addison-Wesley, 1999.

[NSIMULATOR] http://www.isi.edu/nsnam/ns/ns-documentation.html

The invention claimed is:

1. A traffic analysis tool for a network based on TCP/IP or UDP/IP or a combination thereof comprising:
  passive monitoring means at intermediate nodes of the network,
  estimation means to determine a full set of network traffic metrics connected to said passive monitoring means, and
  modeling means for determining a pricing for different users of said network based on a utilization of network resources by said different users,
  wherein said estimation means includes a mechanism for determining goodput by aggregating the number of bytes in all relevant packets received at the node in unit time and deducting from said aggregate the aggregate of the number of bytes in packets that arrive more than once in said unit time,
  wherein said estimation means determines duplicate packets by a mechanism for identifying packets bearing the same packet number,
  wherein said estimation means includes a mechanism for determining link utilization by calculating a ratio of the aggregate link throughput to the capacity of the link,
  wherein said estimation means is based on an analysis of the correlation between sequence numbers of the monitored packets both for forward (data packets) and reverse (acknowledgement packets ('Acks')) packet streams,
  wherein said estimation means includes a mechanism for determining retransmission by detecting retransmissions due to timeout or shrinking of transmission window by identifying when the transmission enters a slow start phase,
  wherein the slow start phase is identified by means determining when the inter-packet time difference is greater than a defined multiple of the average inter-packet time difference, and
  wherein said estimation means determines lost packets by a mechanism for identifying packets for which an additional packet bearing the same packet sequence number is received prior to the receipt of the 'ACK' and the time interval between the receipt of the second packet and the receipt of the 'ACK' is comparable to the estimated round trip time.

2. The tool as claimed in claim 1, wherein said passive monitoring means comprises TCPdump, TCPanaly, Coral Reef, Windmill or any other similar means which makes a copy of the monitored packet and extracts information about the connection (source and destination address and port numbers) and the packet sequence number.

3. The tool as claimed in claim 1, wherein said full set of network traffic metrics includes any of:
  goodput,
  throughput,
  link utilization,
  fraction or percentage of lost packets,
  number or fraction or percentage of retransmitted packets,
  number of duplicate packets, and
  round trip time.

4. The tool as claimed in claim 1, wherein said estimation means includes a mechanism for determining throughput by aggregating the number of bytes in all relevant packets received at the node in unit time.

5. The tool as claimed in claim 1, wherein said estimation means includes a mechanism for determining retransmission by:
  maintaining a count of the number of 'Acks' received for each transmitted packet, with an 'Ack' count of 4 being indicative of a retransmission.

6. The tool as claimed in claim 3, wherein said estimation means determines round trip time by a mechanism for calculating the average time interval between the receipt of a packet and the receipt of its acknowledgement.

7. The tool as claimed in claim 1 applied to the packets pertaining to an individual connection.

8. The tool as claimed in claim 1 applied to packets pertaining to a selected set of connections or to the aggregate of all connections at the node.

9. A traffic analysis method for a network based on TCP/IP or UDP/IP or a combination thereof, said method comprising:
  monitoring passively at intermediate nodes of the network,
  estimating a full set of network traffic metrics, and
  determining a pricing model for different users of said network based on a utilization of network resources by said different users,
  wherein said estimation includes determining goodput by aggregating the number of bytes in all relevant packets received at the node in unit time and deducting from said aggregate the aggregate of the number of bytes in packets that arrive more than once in said unit time,
  wherein said estimation determines duplicate packets for identifying packets bearing the same packet number,
  wherein said estimation determines link utilization by calculating a ratio of the aggregate link throughput to the capacity of the link,
  wherein said estimation is based on an analysis of the correlation between sequence numbers of the monitored packets both for forward (data packets) and reverse (acknowledgement packets ('Acks' )) packet streams,
  wherein said estimation includes determining retransmission by detecting retransmissions due to timeout or shrinking of transmission window by identifying when the transmission enters a slow start phase,
  wherein the slow start phase is identified by determining when the inter-packet time difference is greater than a defined multiple of the average inter-packet time difference, and
  wherein said estimation determines lost packets by a mechanism for identifying packets for which an additional packet bearing the same packet sequence number is received prior to the receipt of the 'ACK' and the time interval between the receipt of the second packet and the receipt of the 'ACK' is comparable to the estimated round trip time.

10. The method as claimed in claim 9, wherein said passive monitoring is through any of TCPdump, TCPanaly, Coral Reef, Windmill or any other similar method which makes a copy of the monitored packet and extracts information about the connection (source and destination address and port numbers) and the packet sequence number.

11. The method as claimed in claim 9, wherein said full set of network traffic metrics includes any of:
  goodput,
  throughput,
  link utilization,
  fraction or percentage of lost packets,
  number or fraction or percentage of retransmitted packets,
  number of duplicate packets, and
  round trip time.

12. The method as claimed in claim 9, wherein said estimation includes determining throughput by aggregating the number of bytes in all relevant packets received at the node in unit time.

13. The method as claimed in claim 9, wherein said estimation includes determining retransmission by:
  maintaining a count of the number of 'Acks' received for each transmitted packet, with an 'Ack' count of 4 being indicative of a retransmission.

14. The method as claimed in claim 11, wherein said estimation determines round trip time for calculating the average time interval between the receipt of a packet and the receipt of its acknowledgement.

15. The method as claimed in claim 9 applied to the packets pertaining to an individual connection.

16. The method as claimed in claim 9 applied to packets pertaining to a selected set of connections or to the aggregate of all connections at the node.

17. A computer program product comprising computer readable program code stored on computer readable storage medium embodied therein for traffic analysis for a network based on TCP/IP or UDP/IP or a combination thereof comprising:
  computer readable program code means configured for monitoring passively at intermediate nodes of the network,
  computer readable program code means configured for estimating a full set of network traffic metrics, and
  computer readable program code means configured for determining a pricing model for different users of said network based on a utilization of network resources by said different users,
  wherein said computer readable program code means configured for estimating includes determining goodput by aggregating the number of bytes in all relevant packets received at the node in unit time and deducting from said aggregate the aggregate of the number of bytes in packets that arrive more than once in said unit time,
  wherein said computer readable program code means configured for estimating determines duplicate packets by a mechanism for identifying packets bearing the same packet number,
  wherein said computer readable program code means configured for estimating determines link utilization by calculating a ratio of the aggregate link throughput to the capacity of the link,
  wherein said computer readable program code means configured for estimating is based on an analysis of the correlation between sequence numbers of the monitored packets both for forward (data packets) and reverse (acknowledgement packets ('Acks')) packet streams,
  wherein said computer readable program code means configured for estimating includes determining retransmission by detecting retransmissions due to timeout or shrinking of transmission window by identifying when the transmission enters a slow start phase,
  wherein the slow start phase is identified by determining when the inter-packet time difference is greater than a defined multiple of the average inter-packet time difference, and
  wherein said computer readable program code means configured for estimating determines lost packets for identifying packets for which an additional packet bearing the same packet sequence number is received prior to the receipt of the 'ACK' and the time interval between the receipt of the second packet and the receipt of the 'ACK' is comparable to the estimated round trip time.

18. The computer program product as claimed in claim 17, wherein said computer readable program code means configured for passive monitoring is through any of TCPdump, TCPanaly, Coral Reef, Windmill or any other similar means which makes a copy of the monitored packet and extracts information about the connection (source and destination address and port numbers) and the packet sequence number.

19. The computer program product as claimed in claim 17, wherein said full set of network traffic metrics includes any of:
goodput,
throughput,
link utilization,
fraction or percentage of lost packets,
number or fraction or percentage of retransmitted packets,
number of duplicate packets, and
round trip time.

20. The computer program product as claimed in claim 17, wherein said computer readable program code means configured for estimating includes determining throughput by aggregating the number of bytes in all relevant packets received at the node in unit time.

21. The computer program product as claimed in claim 17, wherein said computer readable program code means configured for estimating includes determining retransmission by:
maintaining a count of the number of 'Acks' received for each transmitted packet, with an 'Ack' count of 4 being indicative of a retransmission.

22. The computer program product as claimed in claim 19, wherein said computer readable program code means configured for estimating determines round trip time by a mechanism for calculating the average time interval between the receipt of a packet and the receipt of its acknowledgement.

23. The computer program product as claimed in claim 17 applied to the packets pertaining to an individual connection.

24. The computer program product as claimed in claim 17 applied to packets pertaining to a selected set of connections or to the aggregate of all connections at the node.

* * * * *